(12) United States Patent
Iida et al.

(10) Patent No.: US 8,434,507 B2
(45) Date of Patent: May 7, 2013

(54) SAFETY VALVE DEVICE, VALVE APPARATUS, HIGH-PRESSURE GAS TANK, AND VEHICLE

(75) Inventors: Yasuyuki Iida, Toyota (JP); Yasuhiro Yamamoto, Kariya (JP); Yutaka Tano, Toyota (JP); Kunihiko Daido, Osaka (JP)

(73) Assignees: Toyota Jidosha Kabushiki Kaisha, Toyota-shi (JP); Fujikin Incorporated, Osaka-shi (JP)

( * ) Notice: Subject to any disclaimer, the term of this patent is extended or adjusted under 35 U.S.C. 154(b) by 399 days.

(21) Appl. No.: 12/810,676

(22) PCT Filed: Dec. 22, 2008

(86) PCT No.: PCT/JP2008/073908
§ 371 (c)(1),
(2), (4) Date: Jun. 25, 2010

(87) PCT Pub. No.: WO2009/084706
PCT Pub. Date: Jul. 9, 2009

(65) Prior Publication Data
US 2010/0276024 A1 Nov. 4, 2010

(30) Foreign Application Priority Data
Dec. 28, 2007 (JP) ................................. 2007-339642

(51) Int. Cl.
*F16K 17/40* (2006.01)
(52) U.S. Cl.
USPC ................ 137/72; 137/79; 137/354; 251/118

(58) Field of Classification Search ................... 137/72, 137/468, 899, 79, 351, 354; 251/118
See application file for complete search history.

(56) References Cited

U.S. PATENT DOCUMENTS

| 1,806,823 | A | * | 5/1931 | Reid | 422/237 |
|---|---|---|---|---|---|
| 3,651,823 | A | * | 3/1972 | Milsted, Sr. | 137/72 |
| 4,744,383 | A | * | 5/1988 | Visnic et al. | 137/72 |
| 4,800,948 | A | | 1/1989 | Visnic | |
| 5,794,915 | A | * | 8/1998 | Shimizu et al. | 251/127 |
| 6,006,774 | A | | 12/1999 | Lhymn et al. | |
| 6,367,499 | B1 | * | 4/2002 | Taku | 137/72 |
| 7,004,193 | B2 | * | 2/2006 | Heeks et al. | 137/512.2 |

(Continued)

FOREIGN PATENT DOCUMENTS

| JP | 06-165803 A | 6/1994 |
|---|---|---|
| JP | 10-281398 A | 10/1998 |

(Continued)

*Primary Examiner* — Stephen M Hepperle
*Assistant Examiner* — Daniel Edelbrock
(74) *Attorney, Agent, or Firm* — Kenyon & Kenyon LLP

(57) ABSTRACT

A safety valve device has a safety valve body and is configured to open at a temperature of or over a preset reference temperature. The safety valve device also includes a gas flow path arranged to make a flow of hydrogen flowing out of a hydrogen tank via the safety valve body in a valve open position, and a discharge pipe configured to have a hydrogen discharge opening and arranged to discharge the hydrogen flowing through the gas flow path to the outside. The hydrogen discharge opening of the discharge pipe is formed to discharge the hydrogen in an oblique direction relative to a direction of an axial center of the gas flow path. The discharge pipe also has a groove formed to apply an input rotational force to the discharge pipe and thereby rotate the discharge pipe around the axial center of the gas flow path.

7 Claims, 4 Drawing Sheets

U.S. PATENT DOCUMENTS

| | | | |
|---|---|---|---|
| 7,111,818 B2 * | 9/2006 | Takeda et al. | 251/144 |
| 7,337,799 B2 * | 3/2008 | Delfino et al. | 137/79 |
| 2007/0006927 A1 * | 1/2007 | Dallmann et al. | 137/899 |

FOREIGN PATENT DOCUMENTS

| | | |
|---|---|---|
| JP | 2000-193249 A | 7/2000 |
| JP | 2002-168399 A | 6/2002 |
| JP | 2003-342666 A | 12/2003 |
| JP | 2004-136828 A | 5/2004 |
| JP | 2004-263786 A | 9/2004 |
| JP | 2005-147230 A | 6/2005 |
| JP | 2007-106262 A | 4/2007 |
| WO | 2007/146892 A2 | 12/2007 |

* cited by examiner

SAFETY VALVE DEVICE, VALVE APPARATUS, HIGH-PRESSURE GAS TANK, AND VEHICLE

This is a 371 national phase application of PCT/JP2008/073908 filed 22 Dec. 2008, which claims priority of Japanese Patent Application No. 2007-339642 filed 28 Dec. 2007, the contents of which are incorporated herein by reference.

TECHNICAL FIELD

The present invention relates to a safety valve device used for a high-pressure gas tank configured to store a high-pressure gas, as well as to a valve apparatus, the high-pressure gas tank, and a vehicle equipped with the high-pressure gas tank.

BACKGROUND ART

Diversity of vehicles, such as fuel cell vehicles and hydrogen vehicles, have been developed to be equipped with a high-pressure gas tank for storing a high-pressure gas, such as compressed hydrogen, and to be driven with the high-pressure gas stored in the high-pressure gas tank as a fuel gas.

A valve apparatus is generally connected to the high-pressure gas tank for storing the high-pressure gas (compressed gas or liquefied gas) to discharge the high-pressure gas from inside to outside of the high-pressure gas tank and to fill the high-pressure gas from outside to inside of the high-pressure gas tank. A safety valve device is typically connected with the valve apparatus to discharge the high-pressure gas stored in the high-pressure gas tank to the outside in response to a temperature increase of the high-pressure gas tank to or above a preset reference temperature due to, for example, a fire, and thereby prevent an excessive increase of the internal pressure of the high-pressure gas tank.

Various techniques have been proposed for the high-pressure gas tank equipped with such a safety valve device. For example, a technique disclosed in Japanese Patent Laid-Open No. 2007-106262 discharges a gas fuel (high-pressure gas) downward in a vertical direction from a gas fuel tank (high-pressure gas tank) mounted on a vehicle. Other relevant techniques known in the art include Japanese Patent Laid-Open No. 2000-193249, No. H06-165803, No. 2002-168399, and No. 2004-263786.

In a typical application of the high-pressure gas tank with the safety valve device mounted on a vehicle, in conformity with the regulation by the law, the design of the safety valve device is required to prohibit discharge of the high-pressure gas in a forward direction of the vehicle in an active state of the safety valve device. The technique disclosed in Japanese Patent Laid-Open No. 2007-106262, however, may cause the high-pressure gas to be discharged in the forward direction of the vehicle in the active state of the safety valve device. As explained above, the technique disclosed in Japanese Patent Laid-Open No. 2007-106262 discharges the high-pressure gas downward in the vertical direction in the active state of the safety valve device. When the vehicle runs on a down slope, this means that the high-pressure gas is discharged in the forward direction of the vehicle. When this prior art safety valve device is activated in an overturned attitude of the vehicle, the vertically downward discharge causes the high-pressure gas to be released toward the vehicle body. This may expose the driver and the passengers of the overturned vehicle to danger. Namely the technique disclosed in Japanese Patent Laid-Open No. 2007-106262 is not capable of adequately adjusting the discharge direction of the high-pressure gas in the active state of the safety valve device.

DISCLOSURE OF THE INVENTION

In order to solve the problem of the prior art technique explained above, in a typical application of a high-pressure gas tank with a safety valve device mounted on a vehicle, there would be a demand for a technique that is capable of readily adjusting the discharge direction of a high-pressure gas, which is discharged through the safety valve device.

The present invention accomplishes at least part of the demand mentioned above and the other relevant demands by the following configurations and arrangements.

According to one aspect, the invention is directed to a safety valve device used for a high-pressure gas tank configured to store a high-pressure gas. The safety valve device has a safety valve body configured to include a valve mechanism opened at a temperature of or over a preset reference temperature. The safety valve device also includes a gas flow path arranged to make a flow of the high-pressure gas flowing out of the high-pressure gas tank via the safety valve body in a valve open position of the valve mechanism, and a gas discharge pipe configured to have a gas discharge opening and arranged to discharge the high-pressure gas flowing through the gas flow path to outside. The gas discharge opening of the gas discharge pipe is formed to discharge the high-pressure gas in an oblique direction relative to a direction of an axial center of the gas flow path. The gas discharge pipe also has a rotation input structure formed to apply an input rotational force to the gas discharge pipe and thereby rotate the gas discharge pipe around the axial center of the gas flow path.

In the safety valve device according to the above aspect of the invention, the discharge direction of the high-pressure gas from the gas discharge pipe is readily adjustable, in response to application of an externally input rotational force to the gas discharge pipe by the rotation input structure. In the typical application of the high-pressure gas tank with the safety valve device mounted on the vehicle, the safety valve device of the invention can readily adjust the discharge direction of the high-pressure gas. This arrangement effectively improves the performance of adjusting the discharge direction of the high-pressure gas.

In one preferable embodiment of the safety valve device according to the above aspect of the invention, a dust-proof filter is located in the gas discharge opening.

In the safety valve device of this embodiment, the dust-proof filter is set on the gas discharge opening. The dust-proof filter effectively protects the gas discharge opening from invasion of dust from outside of the gas discharge pipe and thereby prevents the potential malfunction of the safety valve device caused by invasion of dust into the gas discharge opening.

In one preferable application of the safety valve device of this embodiment, the dust-proof filter is made of a waterproof, moisture impermeable material.

In the safety valve device of this application, the dust-proof filter made of the waterproof, moisture permeable material additionally protects the gas discharge opening from invasion of water from outside of the gas discharge pipe and thereby prevents the potential malfunction of the safety valve device caused by invasion of water into the gas discharge opening.

In one preferable embodiment of the safety valve device according to the above aspect of the invention, the valve mechanism includes: a valve element; a first fusible material arranged to support the valve element and thereby keep the valve element in a valve closed position and made to be fused at a temperature of or over the preset reference temperature; and a fused material discharge outlet arranged to discharge the fused first fusible material to outside. When the first fusible material is fused and is discharged through the fused material discharge outlet to the outside, the valve element of the valve mechanism moves to a valve open position. The fused material discharge outlet is filled with a second fusible material, which is made to be fused at a temperature of or over the preset reference temperature.

In the safety valve device of this embodiment, the second fusible material is filled into the fused material discharge outlet. This arrangement effectively protects the fused material discharge outlet from invasion of dust and thereby prevents the potential malfunction of the safety valve device caused by invasion of dust into the fused material discharge outlet. A low-melting-point alloy or any other material having a relatively low melting point, such as a low-melting-point resin, may be used for the first fusible material and the second fusible material. The first fusible material and the second fusible material may be made of one identical material or may be made of mutually different materials.

In one preferable application of the safety valve device of the above embodiment, at least one of the first fusible material and the second fusible material is made of an alloy.

In the safety valve device of this application, at least one of the first fusible material and the second fusible material is made of an alloy. A fusing temperature of the alloy can readily be set to a desired temperature by simply changing the composition ratio of the metals of the alloy.

In another preferable application of the safety valve device of the above embodiment, the second fusible material is filled into the fused material discharge outlet in such a manner as to be not protruded from an outer surface of the safety valve body.

In the safety valve device of this application, the fused material discharge outlet is filled with the second fusible material, such that the second fusible material is not protruded from the outer surface of the safety valve body. This arrangement effectively prevents the second fusible material from being dropped off from the fused material discharge outlet when being hit by a foreign substance.

According to another aspect, the invention is also directed to a valve apparatus connected to a high-pressure gas tank configured to store a high-pressure gas. The valve apparatus is equipped with the safety valve device having any of the structures and the arrangements discussed above.

According to still another aspect, the invention is further directed to a high-pressure gas tank configured to store a high-pressure gas. The high-pressure gas tank is equipped either with the safety valve device having any of the structures and the arrangements discussed above or with the valve apparatus.

According to another aspect, the invention is directed to a vehicle having the high-pressure gas tank installed beneath a floor of the vehicle. In the safety valve device, the gas discharge pipe is fastened to the safety valve body and is arranged to, in response to application of the input rotational force to the gas discharge pipe by the rotation input structure, adjust a discharge direction of the high-pressure gas, which is discharged through the gas discharge opening, to be diagonally backward down from the vehicle and toward a space other than a space for the high-pressure gas tank and spaces for wheels of the vehicle.

In the vehicle according to this aspect of the invention, the high-pressure tank is installed beneath the floor of the vehicle. In the safety valve device, application of an externally input rotational force to the gas discharge pipe by the rotation input structure enables the discharge direction of the high-pressure gas, which is discharged through the gas discharge opening, to be adjusted to be diagonally backward down from the vehicle and toward the space other than the space for the high-pressure gas tank and the spaces for the wheels of the vehicle. In the structure of the safety valve device, the gas discharge pipe is fastened to the safety valve body. In a normal orientation of the vehicle that is neither rolled nor overturned, when the safety valve device is activated to discharge the high-pressure gas out of the high-pressure gas tank, this arrangement enables the discharged high-pressure gas to be directly hit against the road surface and thereby accelerates the diffusion of the high-pressure gas.

BEST MODES OF CARRYING OUT THE INVENTION

One mode of carrying out the invention is described below with reference to explanatory representations.

A. Configuration of Vehicle

Figure 1A:
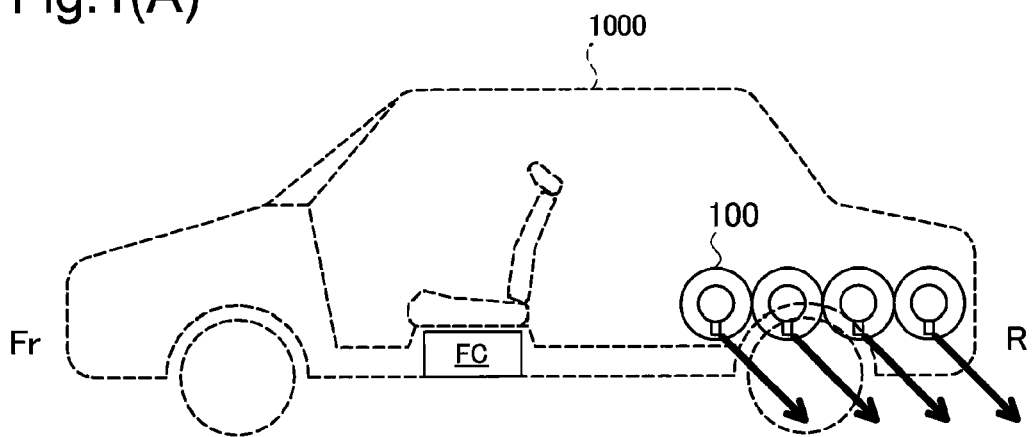
Fig. 1(A) is an explanatory diagrammatic representation of the configuration of a vehicle 1000, shown in side view, in accordance with one embodiment of the invention.
Figure 1B:
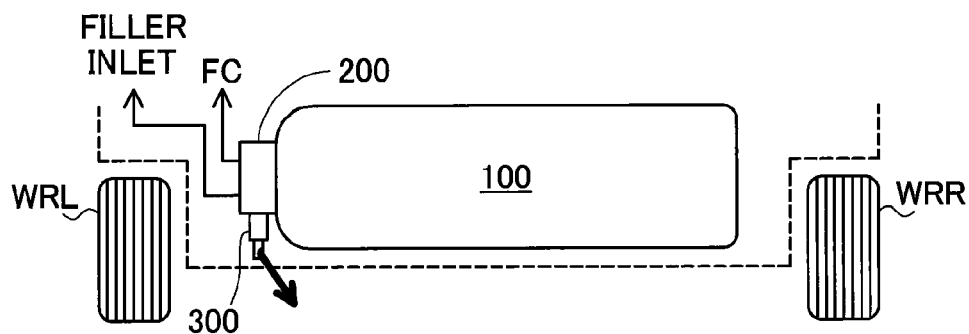
FIG. 1(B) is a partial rear view of the vehicle.
Figure 1C:
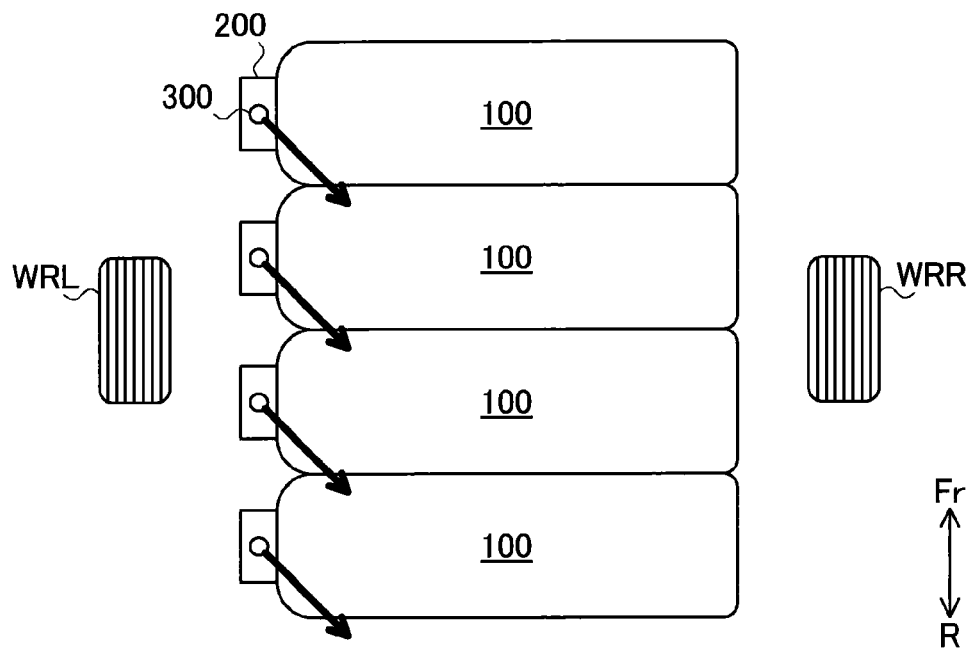
FIG. 1(C) is a partial underside view of the vehicle.

FIG. 1 is explanatory diagrammatic representations of the configuration of a vehicle 1000 in accordance with one embodiment of the invention. FIG. 1(A) shows the appearance of the vehicle 1000 seen from a left side. FIG. 1(B) shows the appearance of the vehicle 100 seen from a back side. FIG. 1(C) shows the appearance of the vehicle 1000 seen from a bottom side.

The vehicle 1000 is constructed as an electric vehicle equipped with fuel cells FC and a battery (not shown) as power sources. An electronic motor (not shown) mounted on the vehicle 1000 is actuated with the electric power generated by the fuel cells FC and with the electric power output from the battery and outputs power to rotate wheels and thereby drive the vehicle 1000. The electric power generated by the fuel cells FC may be accumulated in the battery.

In the vehicle 1000 of the embodiment, the fuel cells FC are located beneath the floor of the vehicle 1000 as shown in FIG. 1(A). Hydrogen tanks 100 for storing compressed hydrogen are located beneath the floor between a left rear wheel WRL and a right rear wheel WRR of the vehicle 1000 and are used to supply hydrogen as a fuel gas to the fuel cells FC. Four hydrogen tanks 100 are mounted on the vehicle 1000 in this embodiment, although the number of hydrogen tanks 100 mounted on the vehicle 1000 may be determined arbitrarily. The hydrogen tank 100 is equivalent to the high-pressure gas tank in the claims of the invention. Various components required for a fuel cell system including the fuel cells FC and the battery, the motor for rotating the wheels, and diversity of functional parts are adequately located beneath the floor of the vehicle 1000 and in other vehicle exterior spaces in front of and behind a vehicle interior, although not being specifically illustrated.

A valve apparatus 200 is connected to each of the hydrogen tanks 100 as shown in FIG. 1(B). The valve apparatus 200 is connected with a hydrogen supply pipe arranged to introduce a supply of the compressed hydrogen stored in each of the hydrogen tanks 100 into the fuel cells FC and a hydrogen filling pipe arranged to fill the compressed hydrogen through a compressed hydrogen filler inlet provided in the vehicle 1000. The valve apparatus 200 is also connected with a safety valve device 300 configured to, in response to a temperature increase of the hydrogen tank 100 to or over a preset reference temperature due to, for example, a fire, discharge the compressed hydrogen out of the hydrogen tank 100 and thereby prevent an excessive increase of the internal pressure of the hydrogen tank 100. The valve apparatus 200 and the safety valve device 300 will be described later in detail.

The safety valve device 300 has a gas flow path arranged to make a flow of hydrogen in an active state of the safety valve device 300 and a discharge pipe with a hydrogen discharge opening arranged to discharge the hydrogen flowing through the gas flow path to the outside, which will be described later in detail. As shown by arrows in FIGS. 1(A) through 1(C), a discharge direction of hydrogen, which is discharged through the hydrogen discharge opening of the discharge pipe in the active state of the safety valve device 300, is adjusted to be diagonally backward down from the vehicle 1000 and toward a space other than the space for the hydrogen tanks 100 and the spaces for the left rear wheel WRL and the right rear wheel WRR of the vehicle 1000. In a normal orientation of the vehicle 1000 that is neither rolled nor overturned, when the safety valve device 300 is activated to discharge hydrogen out of the hydrogen tank 100, this arrangement enables the discharged hydrogen to be directly hit against the road surface and thereby accelerates the diffusion of the hydrogen.

B. Structure of Hydrogen Tank

Figure 2:
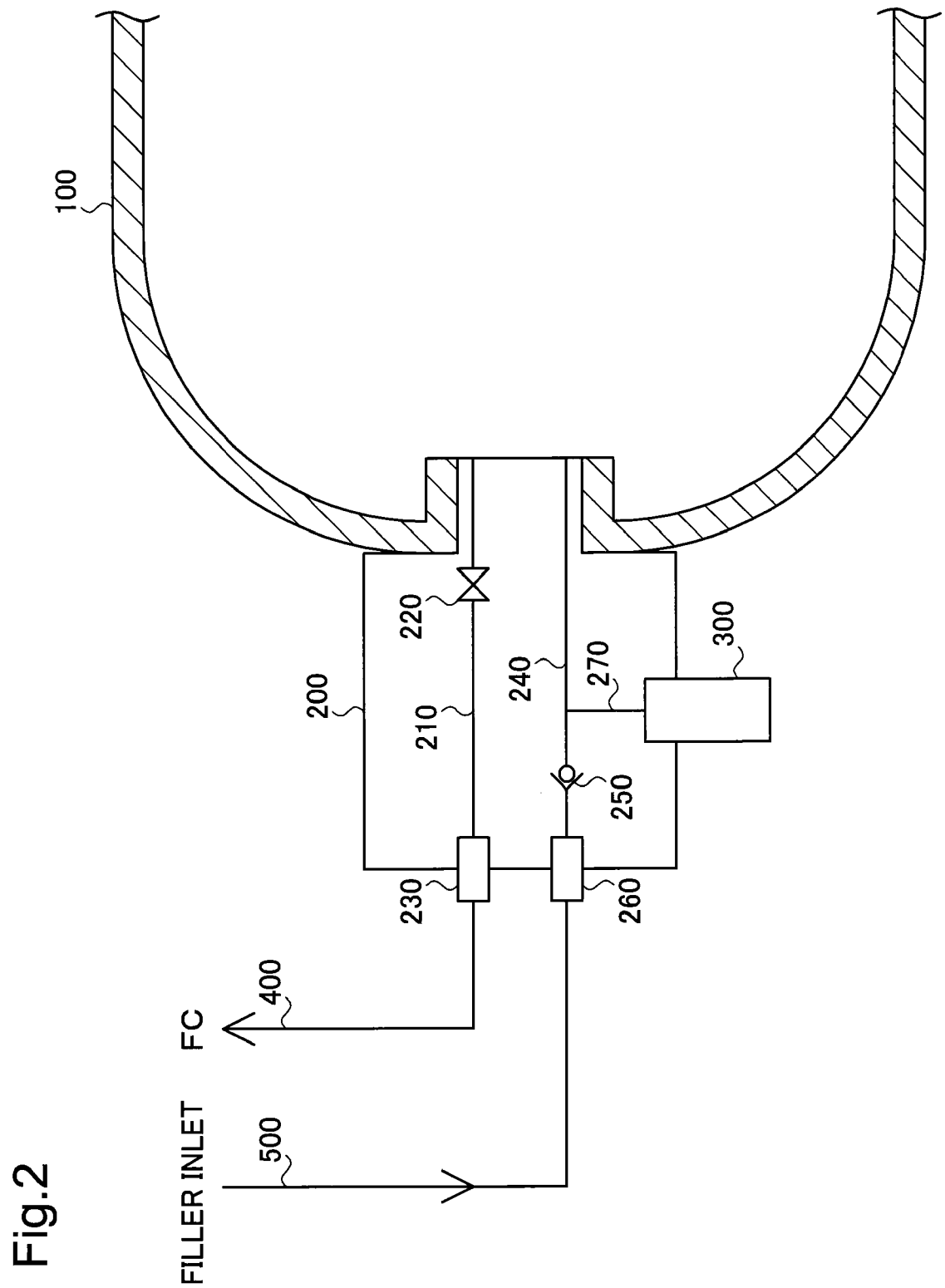
FIG. 2 is an explanatory diagrammatic representation of the structure of a hydrogen tank 100.

FIG. 2 is an explanatory diagrammatic representation of the structure of the hydrogen tank 100. As illustrated, the valve apparatus 200 is connected with the hydrogen tank 100.

A first gas flow path 210 arranged to discharge the compressed hydrogen from inside to outside of the hydrogen tank 100 and a second gas flow path 240 arranged to fill the compressed hydrogen from outside to inside of the hydrogen tank 100 are formed inside the valve apparatus 200 as illustrated. The first gas flow path 210 is equipped with a solenoid valve 220 operated to switch over the passage between permission and prohibition of discharge of the compressed hydrogen from inside to outside of the hydrogen tank 100. The second gas flow path 240 is equipped with a check valve 250 operated to prevent a back flow of the compressed hydrogen from inside to outside of the hydrogen tank 100.

A branch flow path 270 is formed between the check valve 250 located in the second gas flow path 240 and an inner end of the second gas flow path 240 on an inner side of the hydrogen tank 100. The safety valve device 300 is connected with one end of the branch flow path 270 to discharge the compressed hydrogen stored in the hydrogen tank 100 to the outside, in response to a temperature increase of the hydrogen tank 100 to or over a preset reference temperature due to, for example, a fire. The safety valve device 300 will be discussed later in detail.

A joint 230 is attached to an outer end of the first gas flow path 210 formed inside the valve apparatus 200, on an outer side of the hydrogen tank 100. The joint 230 connects the first gas flow path 210 to a hydrogen supply pipe 400 arranged to supply hydrogen to the fuel cells FC. In a valve open position of the solenoid valve 220, the hydrogen stored in the hydrogen tank 100 is introduced through the first gas flow path 210 and the hydrogen supply pipe 400 into the fuel cells FC.

A joint 260 is attached to an outer end of the second gas flow path 240 formed inside the valve apparatus 200, on the outer side of the hydrogen tank 100. The joint 260 connects the second gas flow path 240 to a hydrogen filling pipe 500 arranged to fill the compressed hydrogen through a compressed hydrogen filler inlet provided in the vehicle 1000.

C. Structure of Safety Valve Device

Figure 3:
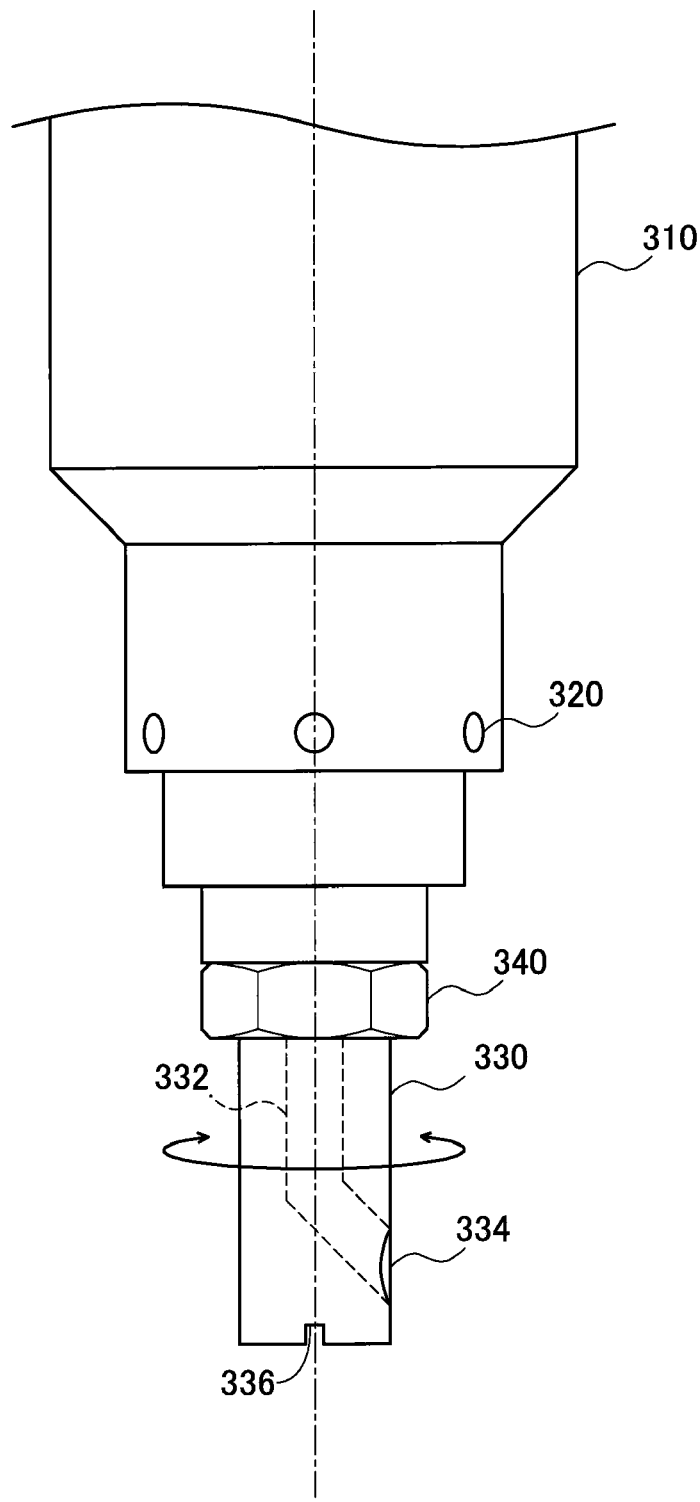
FIG. 3 is an explanatory diagrammatic representation of the structure of a safety valve device 300.

FIG. 3 is an explanatory diagrammatic representation of the appearance of the safety valve device 300. As illustrated, the safety valve device 300 has a safety valve body 310 including a valve mechanism opened at a temperature of or over a preset reference temperature. The safety valve device 300 also has a gas flow path 332 arranged to make a flow of hydrogen discharged out of the hydrogen tank 100 and flowed through the safety valve body 310 in a valve open position of the valve mechanism incorporated in the safety valve body 310. The safety valve device 300 further has a discharge pipe 330 with a hydrogen discharge opening 334 arranged to discharge the hydrogen flowing through the gas flow path 332 to the outside, and a lock nut 340 configured to fasten the discharge pipe 330 to the safety valve body 310.

The valve mechanism provided inside the safety valve body 310 is neither illustrated nor described in detail here. The valve mechanism has a valve element, a fusible material arranged to support the valve element and thereby keep the valve mechanism in a valve closed position and made to be fused at a temperature of or over the preset reference temperature, and multiple fused material discharge outlets 320 arranged to discharge the fused fusible material to the outside. When the fusible material is fused and is discharged through the respective fused material discharge outlets 320 to the outside, the valve element of the valve mechanism shifts to the valve open position. The fusible material used in this embodiment is a binary alloy of bismuth (Bi) and indium (In). The composition ratio of bismuth (Bi) to Indium (In) of the binary alloy used in this embodiment is set in a certain range that enables a fusing temperature or the preset reference temperature to be kept at 110±5(° C.). In the description hereafter, such an alloy with a relatively low melting point is called 'fusible alloy'.

In this embodiment, the discharge pipe 330 is formed in a cylindrical shape. The hydrogen discharge opening 334 of the discharge pipe 330 is formed to discharge the hydrogen flow in an oblique direction relative to a direction of an axial center of the gas flow path 332. A groove 336 is formed on an edge of the discharge pipe 330. The discharge direction of hydrogen, which is discharged through the hydrogen discharge opening 334, can be adjusted to a desired direction by inserting an adequate tool bit, for example, a flathead screwdriver, into the groove 336 and rotating the discharge pipe 330 around the axial center of the gas flow path 332. The groove 336 is equivalent to the rotation input structure in the claims of the invention.

Figure 4:
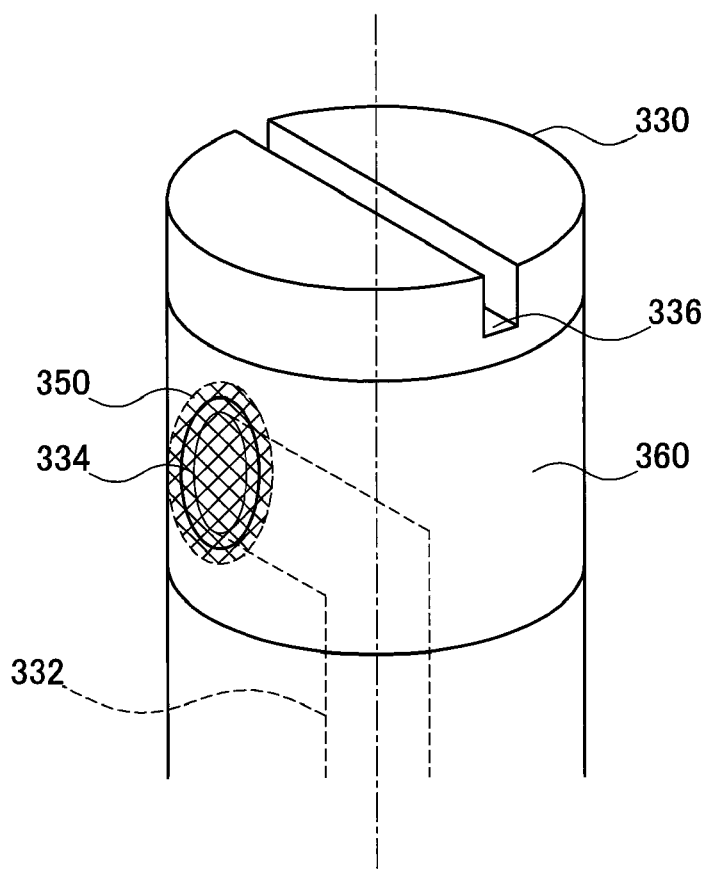
FIG. 4 is an explanatory diagrammatic representation of a discharge pipe 330 or specifically the periphery of a hydrogen discharge opening 334.

FIG. 4 is an explanatory diagrammatic representation of the discharge pipe 330 or specifically the periphery of the hydrogen discharge opening 334. In the discharge pipe 330 of this embodiment, the hydrogen discharge opening 334 is covered with a dust-proof filter 350. The dust-proof filter 350 is bonded to the discharge pipe 330 by means of a sealing film 360, which has a hole formed to allow hydrogen to be discharged from the hydrogen discharge opening 334 via the dust-proof filter 350 to the outside. The dust-proof filter 350 used in this embodiment is made of a waterproof, moisture impermeable material (for example, Gore-Tex (registered trademark)). The dust-proof filter 350 protects the hydrogen discharge opening 334 from invasion of dust or water from outside of the discharge pipe 330 and thereby prevents the potential malfunction of the safety valve device 300 caused by invasion of dust or water into the hydrogen discharge opening 334.

Figure 5:
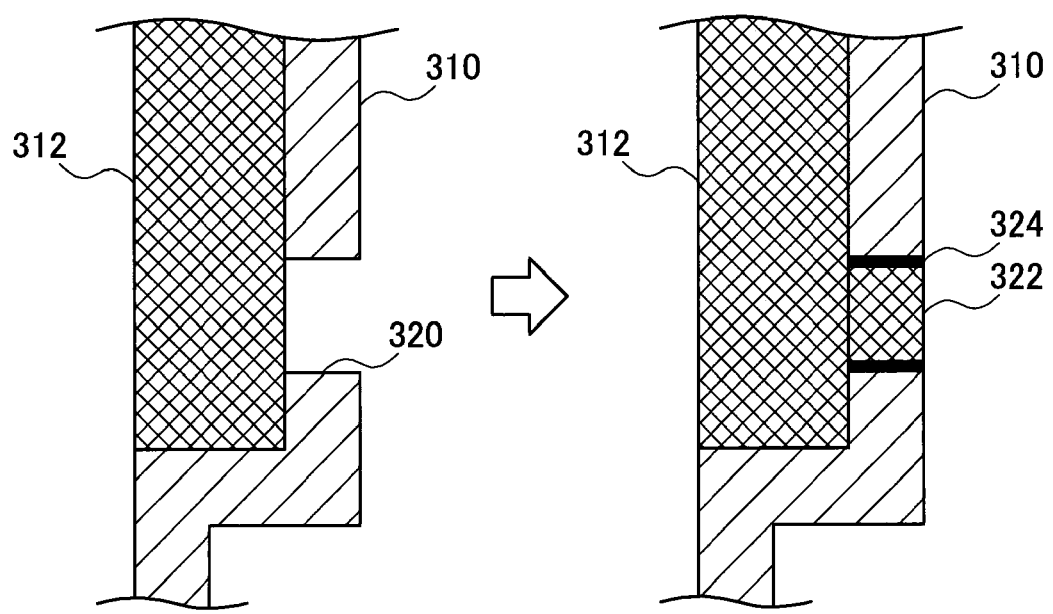
FIG. 5 is explanatory cross-sectional diagrammatic representations of the periphery of one fused material discharge outlet 320 formed in a safety valve body 310.

FIG. 5 is explanatory cross-sectional diagrammatic representations of the periphery of one fused material discharge outlet 320 formed in the safety valve body 310. As illustrated, a fusible alloy 312 as a part of the valve mechanism explained above is located inside the safety valve body 310. In the structure of this embodiment, as shown in the right diagrammatic representation of FIG. 5, a fusible alloy 322 is filled into each of the multiple fused material discharge outlets 320 in such a manner as to be not protruded from the outer surface of the safety valve body 310. The fusible alloy 312 is equivalent to the first fusible material in the claims of the invention, and the fusible alloy 322 is equivalent to the second fusible material in the claims of the invention. In this embodiment, one identical alloy is used for both the fusible alloy 312 and the fusible alloy 322. The fusible alloy 322 is fastened to each of the fused material discharge outlets 320 by means of grease 324. Alternatively the fusible alloy 322 may be fastened to each of the fused material discharge outlets 320 by means of any other cohesive material (for example, an adhesive), in place of the grease 324. This arrangement protects the respective fused material discharge outlets 320 from invasion of dust and thereby prevents the potential malfunction of the safety valve device 300 caused by invasion of dust into the fused material discharge outlets 320. In the structure of this embodiment, the fusible alloy 322 is filled into each of the multiple fused material discharge outlets 320 in such a manner as to be not protruded from the outer surface of the safety valve body 310. This arrangement effectively prevents the fusible alloy 322 from being dropped off from each of the fused material discharge outlets 320 when being hit by a foreign substance.

In the safety valve device 300 of the embodiment described above, the discharge pipe 330 is fastened to the safety valve body 310 by means of the lock nut 340 and is configured to have the groove 336 formed to apply an input rotational force to the discharge pipe 330. This arrangement assures easy adjustment of the discharge direction of hydrogen flowing through the discharge pipe 330. In the typical application of the hydrogen tanks 100 with the safety valve devices 300 mounted on the vehicle 1000, the discharge direction of hydrogen, which is flowed out of the hydrogen tank 100 via the safety valve device 300, is readily adjustable to any adequate direction, for example, to the direction shown in FIG. 1. This arrangement thus effectively improves the performance of adjusting the discharge direction of the high-pressure gas.

D. Other Aspects

The embodiment and its applications discussed above are to be considered in all aspects as illustrative and not restrictive. There may be many modifications, changes, and alterations without departing from the scope or spirit of the main characteristics of the present invention. Some examples of possible modification are given below.

D1. MODIFIED EXAMPLE 1

The safety valve device 300 of the embodiment discussed above has the groove 336 formed to function as the rotation input structure of the invention. The invention is, however, not restricted to this structure. In general, the rotation input structure may be any element designed to apply a rotational force to the discharge pipe 330 and thereby rotate the discharge pipe 330 around the axial center of the gas flow path 332. By way of example, a projection or a hole formed on the discharge pipe 330 may function as the rotation input structure. In another example, the discharge pipe 330 may be formed in a polygonal columnar shape, which allows a rotational force to be applied to the discharge pipe 330 by means of an adequate tool bit, for example, a screw wrench.

D2. MODIFIED EXAMPLE 2

In the structure of the embodiment discussed above, the discharge pipe 330 is partly covered with the dust-proof filter 350 made of the waterproof, moisture permeable material. The invention is, however, not restricted to this application. In one modified application, the dust-proof filter 350 may be made of any suitable material having no waterproof property or moisture permeability. In another modified application, the dust-proof filter 350 may be omitted according to the requirements.

In the structure of the embodiment discussed above, the dust-proof filter 350 is bonded to the discharge pipe 330 by means of the sealing film 360. The invention is, however, not restricted to this arrangement. In one modified arrangement, the dust-proof filter 350 may be bonded to the discharge pipe 330 by means of an adhesive. In another modified arrangement, the dust-proof filter 350 may be fastened to the discharge pipe 330 by means of a cap member or any other suitable element.

D3. MODIFIED EXAMPLE 3

In the embodiment described above, the binary alloy of bismuth (Bi) and indium (In) is used for both the fusible alloy 312 and the fusible alloy 322. The invention is, however, not restricted to this application. Any other suitable alloy may be used for the fusible alloy 312 and the fusible alloy 322. In one modified application, different alloys may be used for the fusible alloy 312 and the fusible alloy 322. In another modified application, at least one of the fusible alloy 312 and the fusible alloy 322 may be replaced with any other suitable fusible material, such as a resin material.

D4. MODIFIED EXAMPLE 4

In the structure of the embodiment discussed above, the fusible alloy 322 is filled into each of the multiple fused material discharge outlets 320 in such a manner as to be not protruded from the outer surface of the safety valve body 310. This structure is, however, neither essential nor restrictive.

D5. MODIFIED EXAMPLE 5

In the structure of the embodiment discussed above, the safety valve device 300 is connected to the valve apparatus 200. This structure is, however, neither essential nor restrictive. In one modified structure, the safety valve device 300 may be connected directly to each of the hydrogen tanks 100.

D6. MODIFIED EXAMPLE 6

In the embodiment described above, the hydrogen tanks 100 are mounted on the electric vehicle driven with the electric power generated by the fuel cells FC (the fuel cell vehicle). This configuration is, however, neither essential nor restrictive. In one modified application, the hydrogen tanks 100 may be mounted on a hydrogen vehicle.

D7. MODIFIED EXAMPLE 7

The above embodiment describes the application of the high-pressure gas tank according to the invention to the hydrogen tank 100. The principle of the invention is also applicable to a high-pressure gas tank configured to store any high-pressure gas other than hydrogen.

The invention claimed is:

1. A vehicle comprising:
at least two wheels;
a high-pressure gas tank storing a high-pressure gas and being installed beneath a floor of the vehicle at a location between the two wheels, the high-pressure gas tank comprising a valve apparatus that includes a safety valve device that is configured to open at a temperature of or over a preset reference temperature;
the safety valve device comprising:
a safety valve body;
a gas flow path arranged to allow a flow of the high-pressure gas flowing out of the high-pressure gas tank via the safety valve body; and
a gas discharge pipe configured to have a gas discharge opening and arranged to discharge the high-pressure gas flowing through the gas flow path to outside,
wherein the gas flow path at the gas discharge opening is in a direction such that the discharged gas is directed obliquely downward, obliquely rearward, and obliquely away from a wheel of the vehicle, and
the gas discharge pipe also has a rotation input structure formed to apply an input rotational force to the gas discharge pipe and thereby rotate the gas discharge pipe;
wherein the gas discharge pipe of the safety valve device is fastened to the safety valve body and is arranged to, in response to application of the input rotational force to the gas discharge pipe by the rotation input structure, adjust a discharge direction of the high-pressure gas.

2. The vehicle in accordance with claim 1, wherein the safety valve body comprises a discharge outlet and contains:
a first fusible material that fuses at a temperature of or over the preset reference temperature and becomes discharged through the discharge outlet to the outside; and
a second fusible material that fills the discharge outlet, which is made to be fused at a temperature of or over the preset reference temperature.

3. The vehicle in accordance with claim 2, wherein at least one of the first fusible material and the second fusible material is made of an alloy.

4. The vehicle in accordance with claim 3, wherein the second fusible material is filled into the fused material discharge outlet in such a manner as to be not protruded from an outer surface of the safety valve body.

5. The vehicle in accordance with claim 2, wherein the second fusible material is filled into the fused material discharge outlet in such a manner as to be not protruded from an outer surface of the safety valve body.

6. The vehicle in accordance with claim 1, wherein the gas discharge opening is equipped with a dust-proof filter.

7. The vehicle in accordance with claim 6, wherein the dust-proof filter is made of a liquid water-impermeable material.

* * * * *